United States Patent
Majmudar

[11] Patent Number: 5,811,886
[45] Date of Patent: Sep. 22, 1998

[54] ANTI-CARJACKING APPARATUS

[75] Inventor: Kashyap Majmudar, Willowdale, Canada

[73] Assignees: Alertcall, Inc.; MKM Electronics, Inc., both of Tonawanda, N.Y.

[21] Appl. No.: 567,998

[22] Filed: Dec. 6, 1995

[51] Int. Cl.[6] .................................................. G08C 19/00
[52] U.S. Cl. ........................ 307/10.2; 307/10.3; 307/10.5; 180/787; 340/426
[58] Field of Search .................................... 307/9.1, 10.1, 307/10.2–10.8, 139, 140, 141, 141.4; 340/425.5, 426, 825.3, 825.32, 825.34, 825.44, 825.69, 825.72; 361/171, 172, 182, 191; 180/287; 123/198 B, 198 DB, 198 DC

[56] References Cited

U.S. PATENT DOCUMENTS

| | | | |
|---|---|---|---|
| 3,907,060 | 9/1975 | Burton | 307/10.2 |
| 4,107,543 | 8/1978 | Kaplan | 307/10.2 |
| 4,300,495 | 11/1981 | Trevino | 123/198 B |
| 4,751,396 | 6/1988 | Daigle et al. | 307/10.2 |
| 5,081,667 | 1/1992 | Drori et al. | 340/426 |
| 5,124,565 | 6/1992 | Yoshida et al. | 307/9.1 |
| 5,132,551 | 7/1992 | Carlo et al. | 307/10.3 |
| 5,132,660 | 7/1992 | Chen et al. | 340/428 |
| 5,184,023 | 2/1993 | Carlo et al. | 307/10.3 |
| 5,349,329 | 9/1994 | Smith | 340/539 |
| 5,481,253 | 1/1996 | Phelan et al. | 307/10.2 |
| 5,557,254 | 9/1996 | Johnson et al. | 340/426 |
| 5,604,384 | 2/1997 | Carlo et al. | 307/10.5 |

*Primary Examiner*—William M. Shoop, Jr.
*Assistant Examiner*—Peter Gangian
*Attorney, Agent, or Firm*—James C. Simmons

[57] ABSTRACT

Apparatus for disabling operation of a vehicle in the event of an attempted theft thereof. A switch is provided in the ignition circuit. The switch is controlled by a processor which is remotely-controllable to open the ignition circuit to prevent the passage of current therethrough. This switch is thus controllable independently of whether the vehicle is in operation whereby the vehicle may be rendered inoperative even after it is discovered that the vehicle has been driven away by a thief.

16 Claims, 2 Drawing Sheets ns apparatus for disabling vehicle operation in the event of an
ANTI-CARJACKING APPARATUS The present invention relates generally to security systems. More particularly, the present invention relates to apparatus for disabling vehicle operation in the event of an attempted theft or carjacking thereof.

Many anti-carjacking systems have been proposed. Examples of such systems are U.S. Pat. Nos. 5,184,023; 5,132,660; 5,132,551; 5,124,565; and 4,751,396. The disclosures of these patents are incorporated herein by reference. These systems are either unduly complex and expensive and/or inconvenient to use and/or not as effective as desired. For example, a key may be made on the spot for a security device known as the "Club." It is thus considered desirable to provide a vehicle security system which is effective to foil carjacking attempts yet is not complex so that it is reliable and inexpensive and is easy and convenient to use.

U.S. Pat. No. 5,132,660 to Chen et al discloses a vehicle security system which has a transmitter, a receiver, a timer, a controller, an alarm circuit, and an anti-theft circuit. The alarm circuit sounds an audible alarm in response to a current being developed in a circuit of the electrical system. The anti-theft circuit renders the ignition switch inoperative when moved to the START position by means of a relay placed in series with the ignition switch start terminal and the starter solenoid of the vehicle.

The sounding of an alarm has only limited effectiveness in foiling a carjacker. Anti-theft circuits such as the one disclosed by Chen et al which allow the user to render a vehicle inoperative upon the user leaving the vehicle so that it cannot be started are effective only to the extent that the user is diligent in arming the vehicle each time he or she leaves it. Unfortunately, many people are not that diligent. In addition, such a disabled car may be started by the use of jumper cables or by pushing it if the car is otherwise startable this way.

It is accordingly an object of the present invention to provide an anti-carjacking system which can be effectively used to foil an attempted carjacking even after the user leaves the car with the system unarmed.

It is a further object of the present invention to provide such an anti-carjacking system which is convenient and easy to use.

It is yet another object of the present invention to provide such an anti-carjacking system which is non-complex both as to manufacture and to installation so that it is reliable and inexpensive.

In order to provide such a carjacking system, in accordance with the present invention, a switch is provided in the ignition or other suitable circuit and is remotely-controllable to open the circuit to prevent passage of current therethrough so that the vehicle becomes inoperable. This switch is controllable independently of whether the vehicle is in operation. Thus, the operation of the switch remotely not only prevents the vehicle from being started but also renders an operating vehicle inoperative, i.e., even after it is discovered that a car has been driven away by a carjacker, the car may still be rendered inoperative.

The above and other objects, features, and advantages of the present invention will be apparent in the following detailed description of the preferred embodiments thereof when read in conjunction with the accompanying drawing.

DETAILED DESCRIPTION OF THE PREFERRED EMBODIMENT

Figure 1:
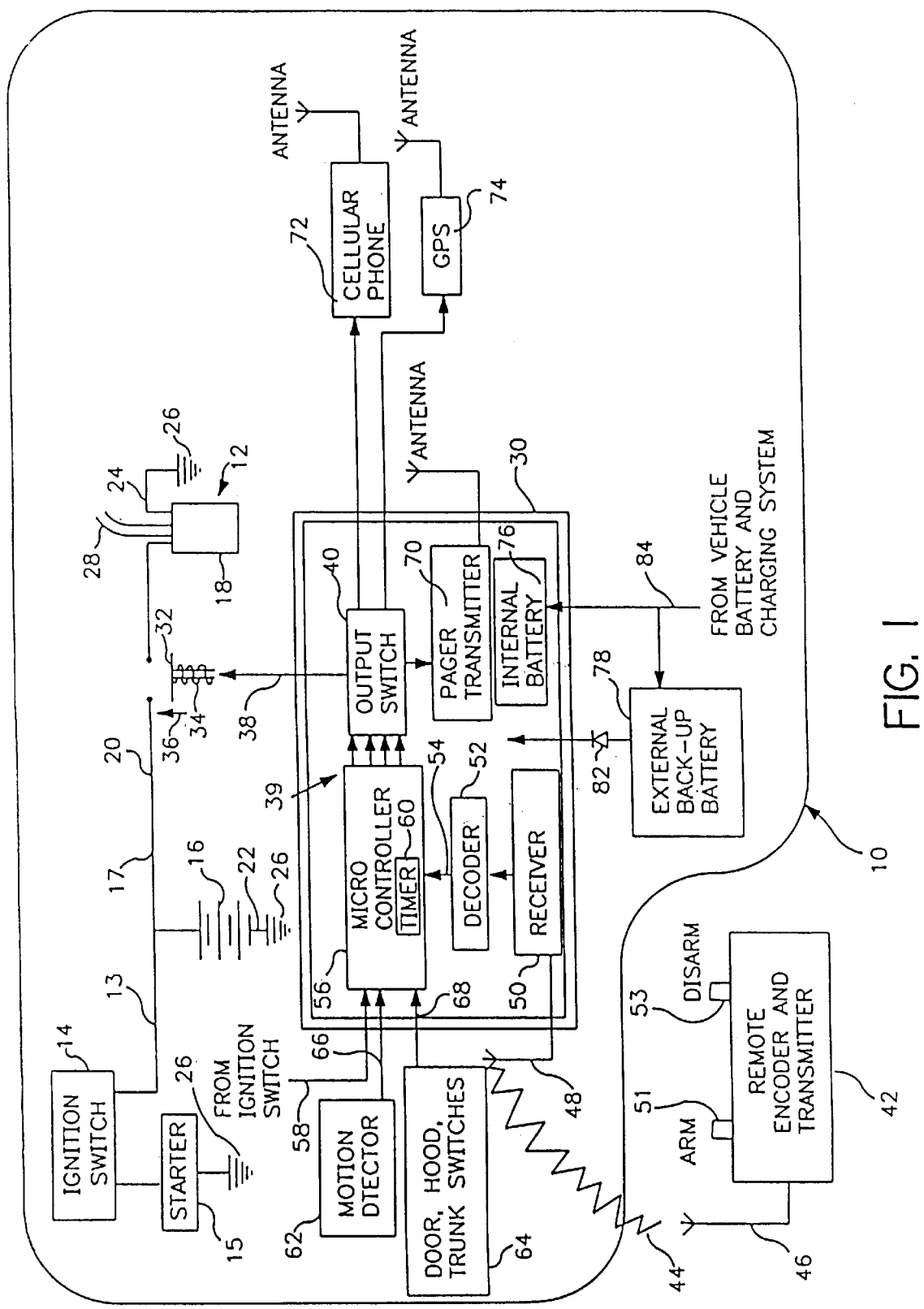
FIG. 1 is a schematic diagram illustrating the present invention.

Referring to the FIG. 1, there is illustrated generally at 10 a car or other vehicle which has a conventional ignition system a portion of which is illustrated at 12. The ignition system typically includes an ignition switch 14 which, upon insertion and manipulation of a key by the driver in a known manner, closes a starter circuit, illustrated at 13, to provide power to a starter 15 for starting the vehicle. Modern automobiles may be provided with an electronic ignition module which achieves the same effect as the ignition switch 14. Once the vehicle is started, the ignition key is released and the starter circuit 13 is opened. Power for continued operation of the vehicle is fed through ignition circuit 17. The ignition circuit 17 includes battery 16, ignition coil 18, line 20 from the battery 16 to the primary winding of the coil 18, and lines 22 and 24 from the battery 16 and primary of coil 18 respectively to ground 26. As conventionally known, the coil 18 develops a high voltage in its secondary winding 28, and this high voltage is delivered through line 28 and a distributor (not shown) to the spark plugs (not shown) or the like.

As used herein and in the claims, the term "ignition circuit" is defined as being a circuit through which power is supplied for continued operation of a vehicle once it is started, and this definition is thus meant to exclude the ignition switch 14 and the starter circuit 13.

There is illustrated at 30 a module in the form of a steel container or the like which may be located under the hood within the engine compartment of the vehicle 10 or perhaps in the trunk and contains various vehicle security system components, as described hereinafter. The container 30 is preferably constructed to inhibit entry thereto so that the components therein cannot be tampered with.

A switch, illustrated at 32, operated by solenoid 34 is provided in the ignition line 20 for movement to the closed position, as illustrated by arrow 36, for normal operation of the vehicle 10 and for movement to the open position, as illustrated in the figure, when it is desired to prevent the vehicle from being started or to stop the operation of the vehicle after it has been driven away by a carjacker. This switch 32 may be easily installed by breaking the wire 20, preferably at a hidden location, and connecting the solenoid contacts thereto. The solenoid 34 is supplied with power for operation of switch 32 through line 38 from a system 39 including an output switch 40 within the module 30, the line 38 passing through the wall of the container 30.

It should be understood that the switch 32 could alternatively be installed at various other suitable locations of the ignition circuit 17 such as, for example, in the primary winding of the coil 18.

Initiation of operation of the output switch 40 is achieved remotely or even from within the vehicle by means of a portable transmitter 42 which may be made small enough, as discussed hereinafter, to conveniently be carried around in the user's pocket. The transmitter 42 is adapted to encode and transmit a signal, illustrated at 44, from its antenna 46 to the antenna 48 of a receiver 50 located within the box 30, the antenna 48 being arranged to extend through the wall of the container 30 so as to alleviate interference by the container with reception of the signal. The transmitter 42 is provided with "arm" and "disarm" buttons 51 and 53 respectively for providing a coded "arm" signal and a differently coded "disarm" signal respectively at its operating frequency, there being on the order of billions of coded combinations available. The signals are accordingly coded to desirably vary from unit to unit. The receiver 50 amplifies and feeds the signal to a conventional decoder 52.

The decoder 52 receives the signal from the receiver 50 and suitably decodes it. If the code matches a pre-set code, the signal is sent to a micro-controller 56. Once activated by an "arm" signal, the decoder 52 is adapted to lock up and provide a "high" signal, perhaps 5 volts, along line 54 to micro-controller 56. The decoder 52 remains locked up, providing such a signal, until it receives a "disarm" signal at which time the line 54 goes "low" or "no signal."

The micro-controller 56 is a unit pre-programmed to continuously scan the condition of line 54 as well as the condition of a line 58 from the ignition switch 14 indicative of whether current is being supplied along line 13 to start the vehicle.

The output switch 40 acts as a buffer to provide energy to output line 38 and other output lines (described hereinafter), i.e., it acts as a power booster.

When "no signal" is received by micro-controller 56 along line 54, indicative of a "disarm" signal from transmitter for normal vehicle operation, the micro-controller 56 supplies current through output switch 40 to line 38 and solenoid 34. The solenoid 34 is wired to close switch 32 and thereby close circuit 17 in response to power being supplied thereto along line 38. The micro-controller continues to supply current for maintaining switch 32 closed for normal vehicular operation until an "arm" signal is received on line 54.

When line 54 goes "high" in response to reception of an "arm" signal, the micro-controller is programmed to stop supplying current through line 38. The solenoid 34 is wired so that switch 32 is "open" to thereby open circuit 17 when no power is being supplied through line 38. As a result, the ignition system 12 is disabled and the vehicle 10 will cease operating. It is thus apparent that, if wire 38 is cut or if any wire is cut which causes power through line 38 to cease, the resulting lack of current in line 38 will cause the switch 32 to "open" and the ignition system to be disabled. The system 39, which includes the components within the module 30, is thus an "active" system, i.e., if the system 39 becomes inoperative, the vehicle ignition system will be disabled. Like an engine computer or any other electronic module critical for engine operation, the system 39 must be operating in order to keep the engine running.

Alternatively, the micro-controller 56 may be pre-programmed to provide a timer means, illustrated at 60, wherein the micro-controller 56 continues to supply current through line 38 to keep switch 32 closed after an "arm" signal is received, but the micro-controller 56 continues to monitor line 58 from the ignition switch and to terminate the supply of current through line 38 a predetermined time, perhaps about 30 seconds, after a current through line 58 is detected, indicative of an attempt to start the vehicle. Thus, the vehicle will operate normally for the predetermined period of time after which the switch 32 will open and its operation will cease. As a result, a carjacker will be lulled into a false sense of success only to find a short while later to his or her surprise or confusion that the vehicle is inoperative.

If desired, the vehicle 10 can also be equipped with a suitably activatable motion detector, illustrated at 62, in the cab or trunk and/or suitably activatable door, hood, and/or trunk switches, illustrated at 64, to detect movement and/or the opening of a door, hood, and/or trunk respectively and to provide signals relative thereto along lines 66 and 68 respectively to micro-controller 56. The micro-controller 56 is pre-programmed to continuously monitor lines 66 and 68 (when activated) as well as lines 54 and 58 and to output a current to output switch 40 for operation of solenoid 34 and/or alarms, as hereinafter discussed, in response thereto.

If desired, the micro-controller may be pre-programmed to signal, after a delay of perhaps about 10 seconds, output switch 40 to operate a pager transmitter, illustrated at 70, or a cellular phone, illustrated at 72, or to activate a global positioning system (GPS) tracking system, illustrated at 74. These devices may be operated noiselessly so as not to alarm a thief. However, if desired, a siren or other alarm can also be provided.

The micro-controller 56 may also be suitably programmed to "override" a "disarm" signal from transmitter 42 and to effect opening of switch 32 by ceasing the supply of current through line 38 and thereby disabling operation of the vehicle in the event that the activated motion detector 62 or switches 64 provide signals along lines 62 or 64 indicative of unauthorized vehicle entry.

The security system may be provided with a small internal back-up battery 76 within the container 30 for use for a limited time to power the components within the module if external power is eliminated. Since the battery 76 must be small and therefore have limited capacity, a greater capacity external back-up 12 volt battery 78 is provided to supply power to the system components, the battery line 80 being provided with a diode 82 to prevent current drain. For normal operation of the system, power is supplied via the vehicle's battery and charging system, as illustrated at 84.

Optionally, the security system may be provided with additional means for disabling the vehicle operation in the event of theft such as, for example, a switch connected in the starter circuit 13 to prevent the vehicle from being started.

The transmitter 42 and receiver 50 may be operated at a frequency of 312 megahertz. This frequency is very crowded. As a result, the transmission is only for a short range since only a low transmitting power is allowed. However, the FCC now allows operation at a frequency of 900 megahertz and allows a power level which provides a range which is perhaps 3 or 4 times greater. This allows the transmitter 42 to be more efficient for a given package size. Thus, it is preferred that the transmitter 42 and receiver 50 be provided to operate at a frequency of 912 megahertz so that the transmitter 42 may be small enough to conveniently fit in one's pocket yet have a sufficient range to be effective.

The micro-controller 56 can be programmed using principles commonly known to those of ordinary skill in the art to which this invention pertains to achieve the features and results described herein. An example of a suitable micro-controller 56 is one having the identification no. PIC16C54 provided by Microchip Technology, Inc. of Chandler, Ariz. Another suitable micro-controller is the Motorola 68HC05K1 micro-controller, and a suitable program therefor is attached hereto and identified as Exhibit A. Other suitable micro-controllers may of course be used.

Figure 2:
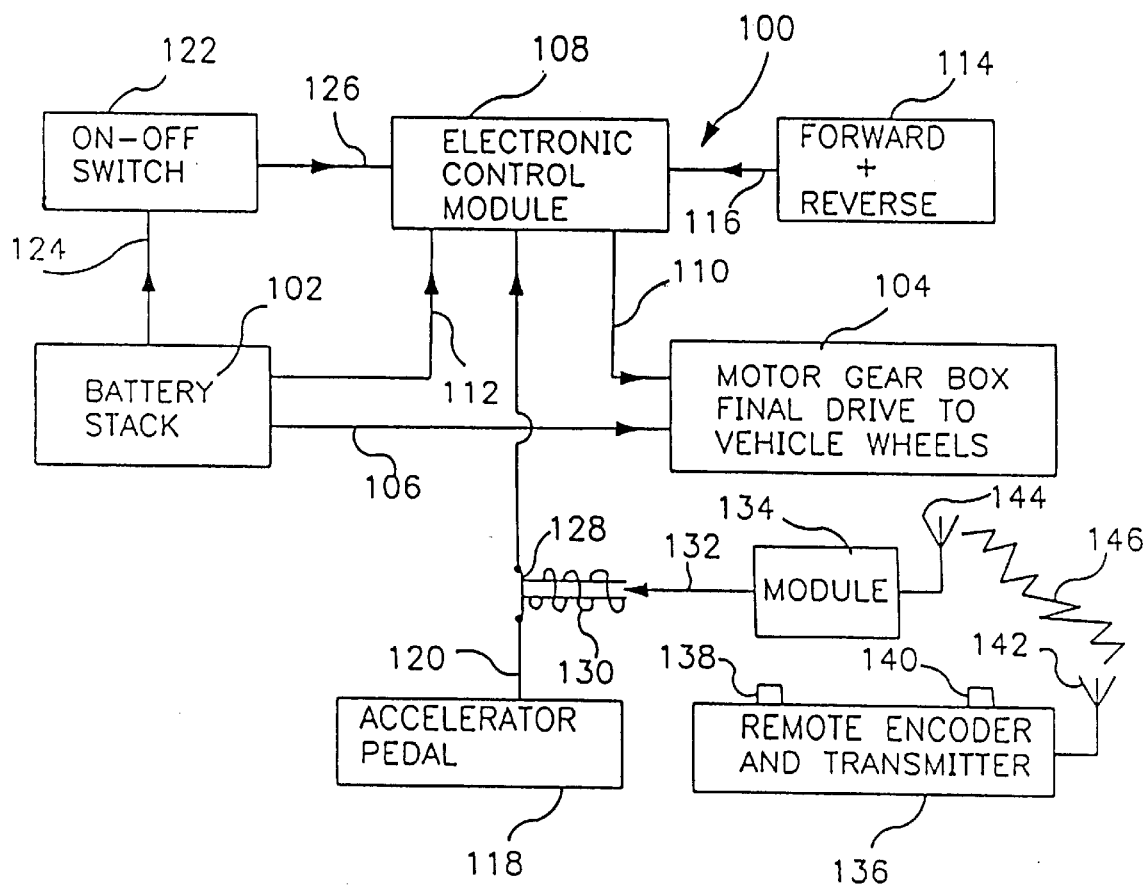
FIG. 2 is a schematic diagram illustrating an alternative embodiment of the present invention.

Referring to FIG. 2, there is illustrated at 100 the motor of a battery-powered vehicle in accordance with another embodiment of the present invention. The power source therefor comprising a battery stack is illustrated at 102. A small auxiliary internal combustion engine (not shown) may be provided to increase range. The battery stack supplies D.C. electrical power to a motorized gear box 104 via line 106 for effecting vehicle movement. Operation of the gear box 104 is controlled by an electronic control module 108 via line 110, and power is supplied to the control module 108 from the battery stack via line 112. The electronic control module 108 receives electrical inputs from a forward/reverse switch 114 via line 116 and from an accelerator pedal 118 via line 120 for energizing the motorized gear box 104 for movement of the vehicle in either forward or reverse and at a rate of speed determined by the accelerator pedal position. In order for the vehicle to move, electrical power must be supplied through lines 116 and 120. An on-off switch or ignition 122 is connected between the battery stack 102 and the control module 108 via lines 124 and 126 respectively. The term "ignition circuit," as used herein and in the claims, is meant to include lines 106, 110, 112, 116, and 120 and to exclude switch 122 and lines 124 and 126, in accordance with the definition previously provided.

In accordance with the present invention, a switch 128, similar to switch 32, operated by solenoid 130 is provided in the accelerator line 120 and is connected via line 132 to a module 134, which is similar to module 30, for movement to the open position when it is desired to remove power from the motorized gear box 104 to prevent the vehicle from moving or to stop the movement of the vehicle after it has been driven away by a carjacker. The switch 128 is shown in the closed position for normal operation of the vehicle. Similarly as described for FIG. 1, a remote encoder and transmitter 136, similar to remote encoder and transmitter 42, is carried about by the vehicle operator for encoding and transmitting "arm" and "disarm" signals 146, by pressing "arm" and "disarm" buttons 138 and 140 respectively, from its antenna 142 to the antenna 144 of module 134.

Alternatively, the switch 128 could be placed in lines 106, 110, 112, or 116. However, since placement of the switch 128 in lines 106 and 112 would require very large capacity solenoids 130 to handle the large amount of power over these lines, the switch 128 is preferably placed in lines 110, 116, or 120.

It should be understood that the present invention may be used with various other types of engines. For example, a switch, similar to switch 32, may be provided in the fuel injector circuit of a diesel engine to stop the supply of power to the fuel injectors thereby cutting off fuel to the engine.

For the purpose of disarming in the event of transmitter failure, a coded micro-chip may be embedded in a key which is insertable in the door-lock for providing a disarm signal to the receiver.

It should be understood that, while the present invention has been described in detail herein, the invention can be embodied otherwise without departing from the principles thereof, and such other embodiments are meant to come within the scope of the present invention as defined by the appended claims.

EXHIBIT A

```
S10600E001010116
S104001700E4
S11302009CA600B700B7E1B7E2A6F0B7041D001F33
S11302100001001F9D0400071F001C00CC02119D5B
S11302201E001C00A673B7E0CD02481D000400FBAD
S1130230CC02119D1D000500D80300D51C00A62684
S1130240B7E0CD0284CC0214BEE03AE126FC3AE223
S109025026F85A26F58190
S10B03F80200020002000200F1
S9030000FC
```

What is claimed is:

1. In combination with a vehicle which includes an ignition circuit, apparatus comprising switch means which is connected in said ignition circuit to be controllable to open the ignition circuit, means for controlling said switch means, both while the vehicle is in operation and while the vehicle is not in operation, to disable operation of the vehicle, means for remotely signaling said controlling means to effect opening of said switch means to disable operation of the vehicle, and means including means for detecting current in the ignition circuit for delaying disabling of operation of the vehicle until a predetermined interval of time elapses after current is detected by said current detecting means in the ignition circuit.

2. Apparatus according to claim 1 further comprising means for supplying power to said switch means to maintain said switch means closed for operation of the vehicle whereby said switch means is opened and operation of the vehicle is disabled when power to said switch means is ceased.

3. Apparatus according to claim 1 wherein said remotely signaling means includes a receiver means and means for transmitting a signal to said receiver means for effecting disabling of the vehicle, and said controlling means is pre-programmed for continuously monitoring an input line from said receiver means and for continuously effecting a supply of power to said switch means to maintain said switch means closed to enable operation of the vehicle in the absence of said disabling signal on said input line from said receiver means and for effecting cessation of power to said switch means when said disabling signal is received on said input line from said receiver means to disable operation of the vehicle.

4. Apparatus according to claim 1 wherein said remotely signaling means comprises a transmitter tuned to transmit at a frequency of 912 megahertz.

5. Apparatus according claim 1 further comprising means for transmitting a signal to at least one of a paging device, a telephone, and a global positioning system device.

6. Apparatus according to claim 2 further comprising at least one of motion detecting means and means for detecting the opening of doors, trunk, and hood of the vehicle.

7. Apparatus according to claim 1 wherein said detecting means comprises circuit means connecting said ignition circuit to said controlling means and said delaying means comprises timer means pre-programmed in said controlling means for delaying, after said controlling means receives said disabling signal, operation of said controlling means to disable operation of the vehicle.

8. Apparatus according to claim 1 wherein said remotely signaling means includes means for remotely signaling said controlling means to close said switch means to enable operation of the vehicle.

9. Vehicle security apparatus comprising switch means, means for connecting said switch means in an ignition circuit of the vehicle to be controllable to open the ignition circuit, means for controlling said switch means, both while the vehicle is in operation and while the vehicle is not in operation, to disable operation of the vehicle, means for remotely signaling said controlling means to effect opening of said switch means to disable operation of the vehicle, and means including means for detecting current in the ignition circuit for delaying disabling of operation of the vehicle until a predetermined interval of time elapses after current is detected by said current detecting means in the ignition circuit.

10. Apparatus according to claim 9 further comprising means for supplying power to said switch means to maintain said switch means closed for operation of the vehicle whereby said switch means is opened and operation of the vehicle is disabled when power to said switch means is ceased.

11. Apparatus according to claim 9 wherein said remotely signaling means includes a receiver means and means for transmitting a signal to said receiver means for effecting disabling of the vehicle, and said controlling means is pre-programmed for continuously monitoring an input line from said receiver means and for continuously effecting a supply of power to said switch means to maintain said switch means closed to enable operation of the vehicle in the absence of said disabling signal on said input line from said receiver means and for effecting cessation of power to said switch means when said disabling signal is received on said input line from said receiver means to disable operation of the vehicle.

12. Apparatus according to claim 9 wherein said remotely signaling means comprises a transmitter tuned to transmit at a frequency of 912 megahertz.

13. Apparatus according to claim 9 wherein said detecting means comprises circuit means for connecting said ignition circuit to said controlling means and said delaying means comprises timer means pre-programmed in said controlling means for delaying, after said controlling means receives said disabling signal, operation of said controlling means to disable operation of the vehicle.

14. Apparatus according to claim 9 wherein said remotely signaling means includes means for remotely signaling said controlling means to close said switch means to enable operation of the vehicle.

15. Vehicle security apparatus comprising switch means, means for connecting said switch means in an ignition circuit of a vehicle to be controllable to open the ignition circuit, means for controlling said switch means, both while the vehicle is in operation and while the vehicle is not in operation, to disable operation of the vehicle, means for remotely signaling said controlling means to disable operation of the vehicle, means for supplying power to said switch means to maintain said switch means closed for operation of the vehicle whereby operation of the vehicle is disabled when power to said switch means is ceased, back-up power supply means for said switch means, and timer means including means for detecting current in the ignition circuit for delaying disabling of operation of the vehicle until a predetermined interval of time elapses after current is detected by said current detecting means in the ignition circuit.

16. Apparatus according to claim 15 wherein said remotely signaling means includes a receiver means and means for transmitting a signal to said receiver means for effecting disabling of the vehicle, and said controlling means is pre-programmed for continuously monitoring an input line from said receiver means and for continuously effecting a supply of power to said switch means to maintain said switch means closed to enable operation of the vehicle in the absence of said disabling signal on said input line from said receiver means and for effecting cessation of power to said switch means when said disabling signal is received on said input line from said receiver means to disable operation of the vehicle.

\* \* \* \* \*